No. 761,667. PATENTED JUNE 7, 1904.
T. F. FLINN.
ROTARY CONVEYING APPARATUS.
APPLICATION FILED NOV. 16, 1903.
NO MODEL. 3 SHEETS—SHEET 1.
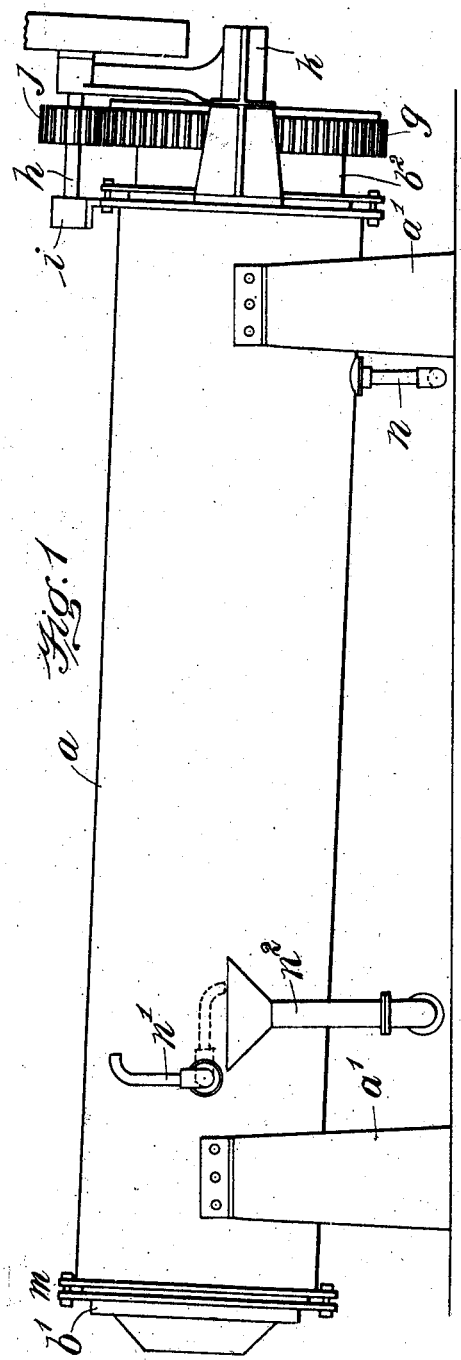
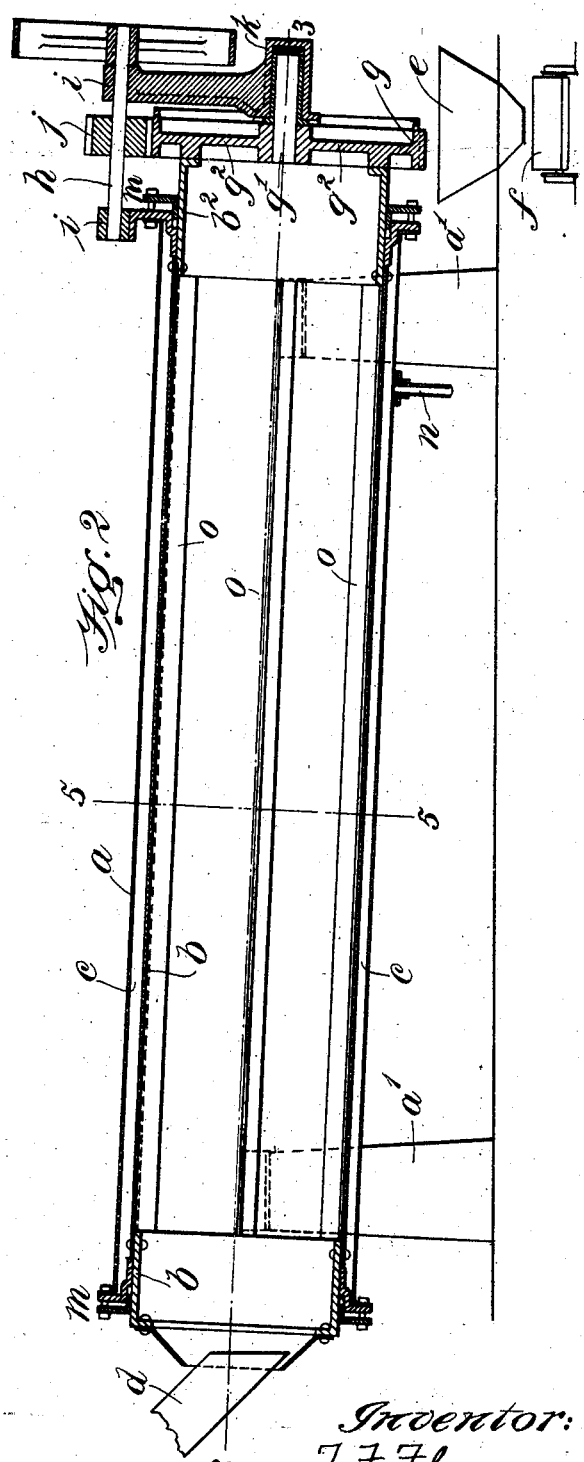

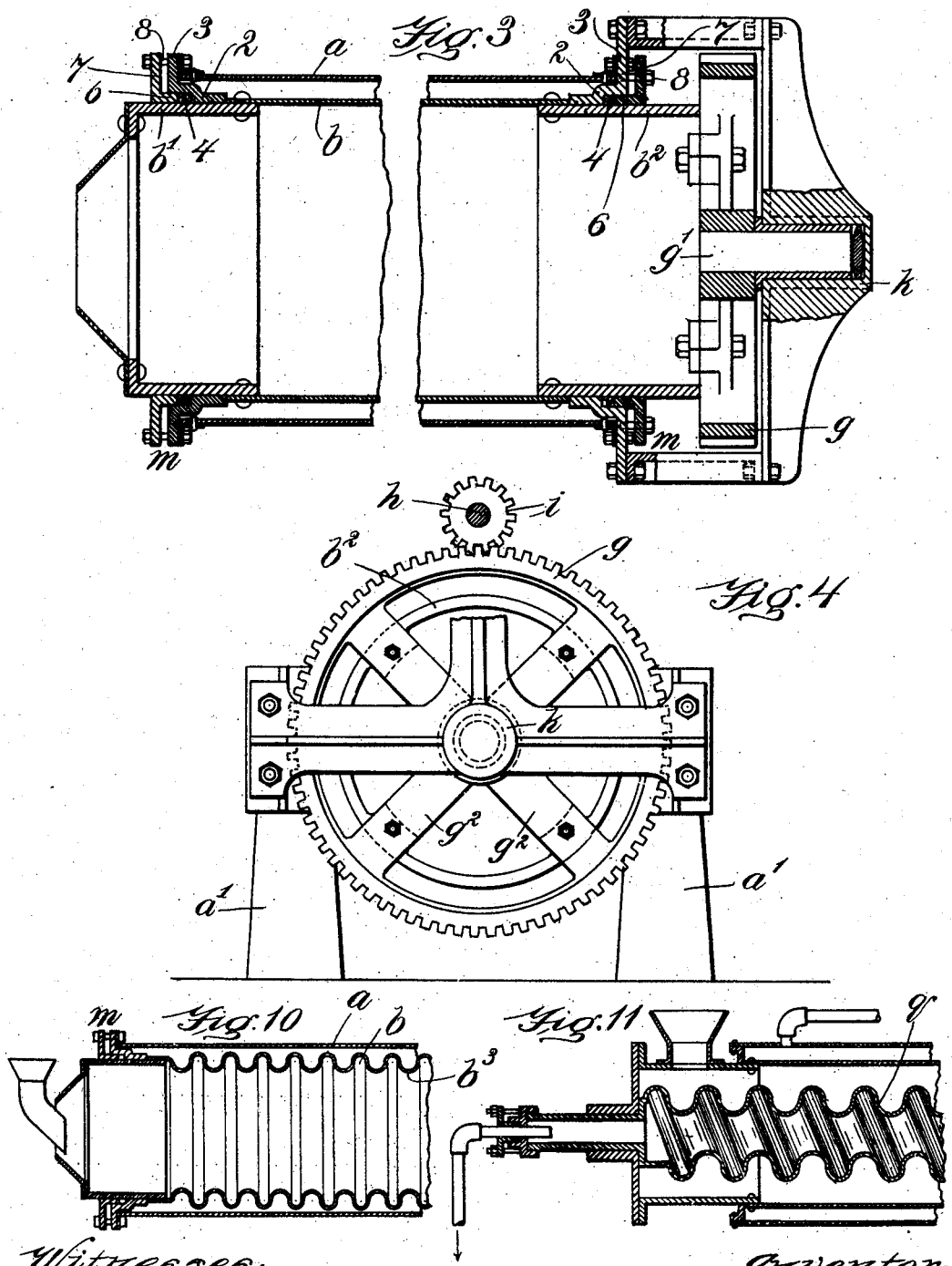

No. 761,667. PATENTED JUNE 7, 1904.
T. F. FLINN.
ROTARY CONVEYING APPARATUS.
APPLICATION FILED NOV. 16, 1903.
NO MODEL. 3 SHEETS—SHEET 3.
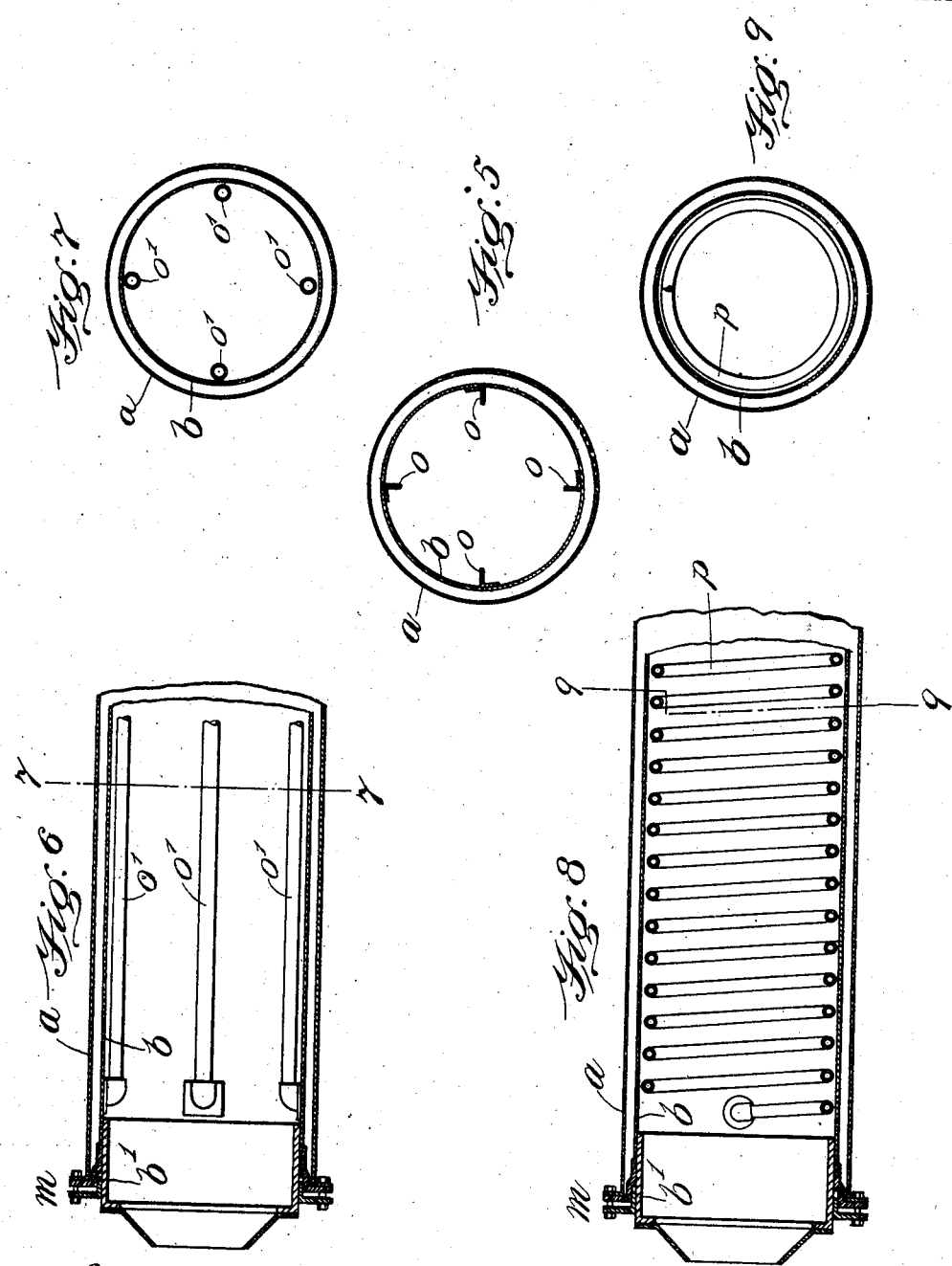

No. 761,667. Patented June 7, 1904.

UNITED STATES PATENT OFFICE.

THOMAS F. FLINN, OF EASTON, PENNSYLVANIA.

ROTARY CONVEYING APPARATUS.

SPECIFICATION forming part of Letters Patent No. 761,667, dated June 7, 1904.

Application filed November 16, 1903. Serial No. 181,267. (No model.)

*To all whom it may concern:*

Be it known that I, THOMAS F. FLINN, of Easton, in the county of Northampton and State of Pennsylvania, have invented certain new and useful Improvements in Rotary Conveying Apparatus, of which the following is a specification.

This invention relates chiefly to apparatus for cooling heated material, the said material being, for example, the so-called "clinkers" produced in the operation of making Portland cement. These clinkers are irregularly-shaped masses of various sizes and emerge from the kiln in a highly-heated condition, so that their temperature has to be reduced prior to subsequent operations to put the material into a marketable condition. The invention relates particularly to cooling apparatus of this class provided with means for circulating water in close proximity to the heated material as it passes through the apparatus, the water absorbing heat from the material and being utilized for boiler-feeding or other purposes.

The invention has for its chief object to enable the water to float or support the rotary conduit, through which the clinkers pass while they are being cooled.

The invention also has for its object to provide a simple, durable, and effective construction having in view the general object above mentioned.

The invention consists in the improvements which I will now proceed to describe and claim.

Of the accompanying drawings, Figure 1 represents a side elevation of a cooling apparatus embodying my invention. Fig. 2 represents a longitudinal vertical section of the same. Fig. 3 represents a section on line 3 3 of Fig. 2 on a larger scale, portions being broken away. Fig. 4 represents an end elevation of the rear or delivering end of the apparatus. Fig. 5 represents a section on line 5 5 of Fig. 2. Fig. 6 represents a longitudinal section of a portion of the apparatus, showing a modification. Fig. 7 represents a section on line 7 7 of Fig. 6. Fig. 8 represents a view similar to Fig. 6, showing another modification. Fig. 9 represents a section on line 9 9 of Fig. 8. Figs. 10 and 11 represent sectional views of other modifications.

The same reference characters indicate the same parts in all the figures.

In the drawings, $a$ represents a fixed casing which is preferably of cylindrical form and is preferably mounted in an inclined position upon supports $a'$ $a'$. The casing $a$ may be conveniently constructed as a tubular shell, the construction of which may be similar to that of an ordinary steam-boiler shell.

$b$ represents a rotary cylindrical conduit which is located within the casing $a$ and is adapted to rotate therein, the said conduit or inner casing being separated from the outer casing by an annular space $c$, adapted to contain and conduct water, the casing $a$ constituting the outer wall of a water-jacket, while the conduit $b$ constitutes the inner wall of said jacket. The conduit $b$ is provided with end sections $b'$ $b^2$, which are preferably castings of greater thickness than the body or main portion of the conduit $b$, said end portions projecting beyond the ends of the casing $a$. The end section $b'$ is provided with a receiving-opening through which the material to be cooled enters the higher end of the conduit, a spout or chute being here shown at $d$ to conduct the material into the conduit. The end section $b^2$ is arranged to deliver the material that passes through the conduit into a hopper $e$ or other outlet, from which the material may pass into a car or carrier $f$. Means are provided for rotating the conduit $b$, said means, as here shown, comprising a gear $g$, affixed to the end section $b^2$, a driving-shaft $h$, journaled in fixed bearings $i$ $i$, and a gear $j$, fixed to said shaft and meshing with the gear $g$. The gear $g$ is provided with a shaft $g'$, which is journaled in a fixed bearing $k$. The spokes or arms $g^2$ of the gear $g$ are separated by spaces of sufficient size to permit the material to escape from the lower end of the conduit through said spaces.

Means are provided for closing the ends of the water-jacket, said means in this embodiment of my invention being stuffing-boxes $m$ $m$, secured to the casing $a$. Each stuffing-box includes, first, a ring 2, having a flange 3 fixed to one of the ends of the casing *a*, said ring having a cavity 4 for the reception of packing, and, secondly, a gland 6, formed to enter the cavity 4 and provided with a flange 7, which is connected by bolts 8 with the flange 3 of the ring 2. The ring 2 and gland 6 of each stuffing-box have a close fit upon the exterior of the corresponding portion of the rotary conduit and hold the packing in the cavity 4 closely against the conduit, so that while the latter is free to rotate the escape of water from the ends of the water-jacket is prevented.

*n* represents a water-inlet, which preferably communicates with the lower portion of the water-jacket, and *n'* represents a water-outlet, which preferably communicates with one side of the water-jacket at a point above its bottom and below its top. The pipe *n* may receive water from any suitable source of supply, while the pipe *n'* may discharge the heated water into a conduit $n^2$, connected with a hot-well, from which the water heated in the water-jacket, as hereinafter described, may be supplied to the boiler.

The interior of the rotary conduit *b* is preferably provided with means for agitating or alternately raising and dropping the material passing through the conduit. To this end the conduit may be provided with longitudinal inwardly-projecting lips or flanges *o*, as shown in Figs. 2 and 5. The rotation of the conduit causes said flanges to take up portions of the material, raise the same to the upper portion of the conduit, and then drop the raised material to the bottom of the conduit. In Figs. 6 and 7 I show in lieu of the flanges *o* and for the same purpose longitudinally-extending pipes *o'*, which communicate at their ends with the water-jacket, so that they contain water which is heated by the heated material in contact with the said pipes *o'*.

It will be seen that when the conduit *b* is rotated and heated material is introduced into its upper end, the conduit being inclined, the heated material is caused to pass by degrees to the lower end and is discharged therefrom, heat being continuously absorbed during the passage of the material by the water in the water-jacket and in the pipes *o'* when the latter are employed. It will be seen that by combining the rotary conduit or inner casing with the fixed outer casing in such manner as to form a water-jacket surrounding the conduit I enable the body of water to not only absorb heat from the material, but also to float or support the conduit, thus reducing to the minimum the power required to rotate the conduit. It will also be seen that I obviate the employment of external rings and antifriction-rollers supporting the same, which would be required if the external wall of the water-jacket were rigidly connected to the inner wall, so that the two rotate together. The described arrangement of the outlet-pipe *n'* at one side of the casing and at a point between the top and bottom enables the water-level in the higher end of the water-jacket to be raised or lowered in order that the liquid may have any desired effect in floating the rotary conduit.

I do not limit myself to the employment of an inclined conduit, as shown in Figs. 1 and 2, as the feeding of the material through the conduit may be effected by providing spiral ridges or projections on the inner surface of the conduit, as shown in Figs. 8 and 11. In Fig. 8 the spiral ridges are the convolutions of a helical pipe *p*, the ends of which communicate with the water-jacket, the said convolutions being in contact with the internal surface of the conduit *b*. In Fig. 11 I show the spiral ridges formed on the exterior of a water-conducting pipe *q*, which may extend through the conduit. In Fig. 10 I show the conduit as having corrugations $b^3$ in its walls to increase the area of heat-absorbing surface.

The overflow-pipe *n'* is preferably adjustable, so that the height of its delivering end may be varied to correspondingly vary the height of the body of liquid in the jacket. It is desirable to have no more water in the jacket than is required to float the conduit *b*. If too much water is present, the conduit will be pressed upwardly and excessive friction will be developed at the upper portions of the stuffing-boxes. The overflow-pipe *n'* may be made adjustable by jointing it to the cylinder *a*, so that the pipe can be swung, and thus caused to stand vertically, horizontally, or at an intermediate angle.

The apparatus may be used for drying instead of cooling, in which case the water in the jacket may be heated by exhaust-steam or otherwise. The material to be dried is passed through the conduit and dried by the heat from the jacket.

I claim—

1. An apparatus of the character stated, comprising a water-jacket having a fixed outer portion and a rotatable inner portion, the latter constituting a conduit for the material to be cooled, means for rotating said inner portion, and means for circulating water through said jacket.

2. An apparatus of the character stated, comprising a fixed outer casing constituting the outer wall of a water-jacket, a revoluble cylinder constituting not only the inner wall of said jacket but also a conduit for the material to be cooled, means for closing the ends of the water-jacket, and means for rotating the cylinder, the said casing having a water-inlet and a water-outlet arranged to maintain a body of liquid in the jacket, said liquid sustaining or floating the cylinder and absorbing heat from the material which passes through the latter.

3. An apparatus of the character stated, comprising a fixed inclined casing constituting the outer wall of a water-jacket, a revoluble inclined cylindrical conduit constituting the inner wall of said jacket, means for closing the ends of the jacket, means for rotating the said conduit, a water-inlet communicating with the lower portion of the casing, and a water-outlet communicating with the casing at a point above the lower side of its upper end portion, whereby the warmest water in the jacket is located at the clinker-receiving end of the conduit and the colder water at the delivering end thereof.

4. An apparatus of the character stated, comprising a fixed casing constituting the outer wall of a water-jacket, a revoluble cylindrical conduit constituting the inner wall of said jacket, stuffing-boxes at the ends of the casing embracing the end portions of the conduit, means for supplying water to said jacket, and means for rotating the conduit.

5. An apparatus of the character stated, comprising a fixed casing constituting the outer wall of a water-jacket, a revoluble cylindrical conduit constituting the inner wall of said jacket, means for closing the ends of the jacket, the ends of the conduit projecting from the jacket, a gear affixed to one of said projecting ends, means for supplying water to said jacket and means for driving said gear.

6. An apparatus of the character stated, comprising a fixed casing constituting the outer wall of a water-jacket, a revoluble cylindrical conduit constituting the inner wall of said jacket, stuffing-boxes at the ends of the casing embracing portions of the conduit, means for supplying water to said jacket, means for rotating the conduit, and means for agitating material passing through said conduit.

7. An apparatus of the character stated, comprising a water-jacket having a fixed outer portion and a rotatable inner portion, the latter constituting a conduit for the material to be cooled, means for rotating said inner portion, means for circulating water through said jacket, and water-conducting projections on the inner surface of the said conduit, said projections communicating with the water-jacket.

8. An apparatus of the character stated, comprising a water-jacket having a fixed outer portion and a rotatable inner portion, the latter constituting a conduit for the material to be cooled, means for rotating said inner portion, means for circulating water through said jacket, and means for regulating the height of the body of liquid in the jacket.

9. An apparatus of the character stated, comprising a cylindrical conduit for material to be treated, a liquid support for said conduit, and means for rotating the conduit.

10. An apparatus of the character stated, comprising a cylindrical conduit for material to be treated, means for floating and rotating said conduit, and means for agitating the material as it passes through the conduit.

In testimony whereof I have affixed my signature in presence of two witnesses.

THOMAS F. FLINN.

Witnesses:
   GEORGE P. ABORN,
   C. F. BROWN.